Sept. 14, 1954  A. T. SCHEIWER  2,689,138
COUPLING
Filed June 18, 1949
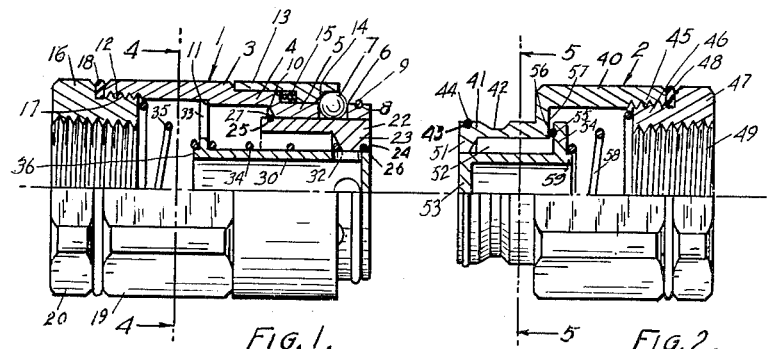
Fig. 1.   Fig. 2.
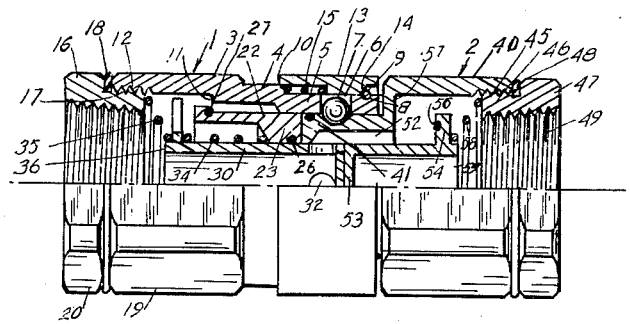
Fig. 3.
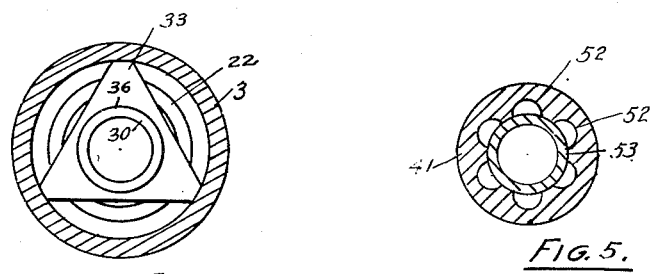
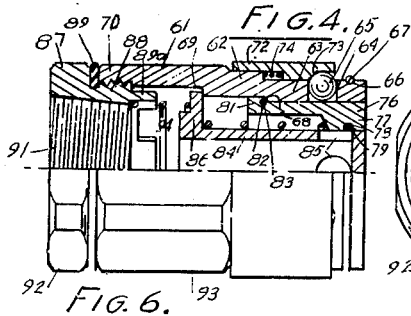
Fig. 6.
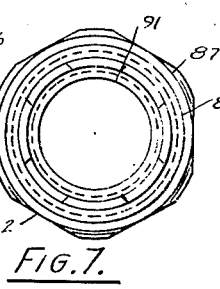
Fig. 7.
INVENTOR.
Albert T. Scheiwer
BY
Florian L. Miller
Atty.

Patented Sept. 14, 1954

2,689,138

UNITED STATES PATENT OFFICE 2,689,138

COUPLING

Albert T. Scheiwer, Erie, Pa.

Application June 18, 1949, Serial No. 100,063

4 Claims. (Cl. 284—18)

This invention relates generally to hose couplings and more particularly to swivel type, quick connecting, cam operated couplings for hose or the like.

All couplings of this character, made in accordance with the teachings of the prior art and with which I am familiar, when provided with a check valve, have been difficult to seal when disconnected, especially the ends thereof, to keep out dirt and dust. Where attempts have been made to seal up the ends of the coupling members upon disconnection, leakage of the fluid resulted in many instances because of the dirt and other extraneous matter which covered the seat and the washer on the check valve, the seat in this valve being adjacent the ends thereof. Couplings of this type which have provided, in addition to a check valve, means for holding the locking sleeve out of operative position to permit automatic connection of the male and female members without manual operation of the locking sleeve have been complicated, difficult to manufacture, high in cost, and the flow therethrough has been materially restricted. It has further been difficult in these prior couplings to maintain the check valves and sleeves in alignment and they become misaligned and cause leakage of the coupling member when they are in a disconnected position.

It is, accordingly, an object of my invention to provide a hose coupling which overcomes the above and other defects in present cam type hose couplings and it is more particularly an object of my invention to provide a coupling which is simple in construction, economical in cost, economical in manufacture, and efficient in operation.

Another object of my invention is to provide a male coupling member in a coupling which has a check valve which seals the end of the coupling member against dirt and other extraneous matter and which seals the fluid in the coupling member at a point remote from the end thereof.

Another object of my invention is to provide a coupling with a sleeve for holding the locking cams or balls in the path of the locking sleeve to permit connection of the male member with the female member without manual operation of the locking sleeve.

Another object of my invention is to provide a quickly attachable coupling with a check valve therein which permits maximum flow of fluid.

Another object of my invention is to provide novel means for guiding the check valve in the male and female coupling members of a coupling.

Other objects of my invention will become evident from the following detailed description, taken in conjunction with the accompanying drawings, in which Figs. 1 and 2 are side elevational views broken away on the center lines thereof of a female coupling member and a male coupling member respectively;

Fig. 3 is a side elevational view with the upper part thereof broken away on the center line thereof showing the male and female coupling members in Figs. 1 and 2 in a locked position;

Fig. 4 is a view taken on the line 4—4 of Fig. 1;

Fig. 5 is a view taken on the line 5—5 of Fig. 2;

Fig. 6 is a side elevational view broken away on the center line thereof of a modified form of the female coupling member shown in Fig. 1; and Fig. 7 is an end view of the female coupling member shown in Fig. 6.

Referring now to the drawings, I show in Figs. 1 to 5 inclusive a female coupling member 1 and a male coupling member 2. The female coupling member 1 comprises a cylindrical sleeve 3 having stepped portions 4 and 5, radially extending, ball retaining apertures 6 having cams or balls 7 retained therein, a peripheral groove 8 for retaining a spring stop clip 9, inner shoulders 10 and 11, and an internally threaded portion 12. A locking sleeve 13 having a depending camming portion 14 is telescopically disposed on the stepped portions 4 and 5 of the sleeve 3, the camming portion 14 thereof being urged against the balls 7 and against the stop clip 9 by a coil spring 15. A connecting member 16 has an extending internally threaded portion 17 for threadably engaging the internal threaded portion 12 of the sleeve 3 and a washer 18 is disposed between the end of the sleeve 3 and the member 16. The sleeve 3 and the connecting member 16 have external, wrench engaging portions 19 and 20. An intermediate sleeve 22 having an inwardly directed portion 23 is telescopically disposed on the inner periphery of the stepped portion 5 of the sleeve 3 and it has an internal peripheral groove 24 and an external peripheral groove 25 for receiving washers 26 and 27 respectively. A movable inner cup shaped sleeve 30 is disposed centrally of the sleeve 22 and the sleeve 3, the inwardly directed portion 23 of the sleeve 22 riding on the sleeve 30. The inner movable sleeve 30 has radially extending apertures 32 and a triangular shaped guiding member 33 on the rear end thereof for engaging the shoulder 10 of the sleeve 3. A coil spring 34 surrounds the sleeve 30 and is disposed between the guiding portion 33 of the sleeve 30 and the projecting portion 23 of the sleeve 22. A spiral spring 35 engages the end 36 of the sleeve 30 and the inner end of the connecting member 16 to urge the guiding portion 33 of the sleeve 30 against the shoulder 10 of the sleeve 3.

The male member 2 comprises a cylindrical member 40 having a reduced connecting portion 41 with a peripheral groove 42 adapted to be engaged by the balls 7 carried by the female member 1. The connecting portion 41 of the sleeve 40 has a peripheral groove 43 for retaining a ring washer 44. The sleeve 40 also has an internally threaded portion 45 for threadably engaging the externally threaded inner end 46 of a connecting member 47. A washer 48 is disposed between the end of the cylindrical member 40 and the connecting member 47. The connecting member 47 has an internally threaded portion 49 for threadably engaging a threaded hose coupling or the like. The connecting portion 41 of the sleeve 40 has an inwardly directed flange 51 and internal, circumferentially spaced, longitudinally extending, semicircular shaped grooves 52. A cup shaped sleeve 53 is telescopically disposed in the connecting portion 41 of the sleeve 40 and it has an outwardly directed flange 54 on the inner end thereof with a circular groove 55 for receiving a ring washer 56 which sealingly engages the inner shoulder 57 of the sleeve 40. A spiral spring 58 engages the projecting end 59 of the sleeve 53 and the other end thereof abuts against the inner end of the connecting member 47.

In the operation of my novel coupling, the locking sleeve 13 is initially pulled back on the stepped portions 4 and 5 of the sleeve 3 to a position shown in Fig. 1 wherein the camming portion 14 of the locking sleeve 13 clears the camming members or balls 7. The spring 34 then urges the intermediate sleeve 22 towards the end of the sleeve 3 whereby the washer 27 sealingly engages the inner shoulder 10 of the sleeve 3 and the balls 7 are held outwardly in the path of the camming portion 14 of the locking sleeve 13. The female member 1 is then ready to be engaged by the male member 2 without manual operation of the locking sleeve 13. The connecting portion 41 of the cylindrical member 40 of the male member 2 is then forced against the sleeve 22 and it is pushed rearwardly to a position shown in Fig. 3 or until the balls 7 engage the peripheral groove 42 in the connecting portion 41 of the male member 2. The locking sleeve 13 is then moved forwardly by the spring 15 until the camming portion 14 thereof engages the stop clip 9, the balls 7 being locked into engagement with the peripheral groove 42 of the connecting portion 41 of the male member 2. The inner sleeve 30 is engaged by the sleeve 53 in the male member 2 and it is urged to the rear a predetermined amount as shown in Fig. 3 while the washer 56 on the sleeve 53 in the male member 2 is urged out of sealing relationship with the shoulder 57 of the sleeve 40 whereby fluid may flow outwardly through the laterally extending apertures 32 in the sleeve 30 and through the longitudinally extending grooves 52 in the connecting portion 41 of the male member 40 or vice versa.

To disconnect the coupling shown in Fig. 3, the locking sleeve 13 is pulled to the left until the camming portion 14 thereof clears the balls 7 wherein they move outwardly in the ball retaining apertures 6 and the springs 34 and 35 urge the connecting portion 41 of the male member 2 outwardly followed by the sleeve 22 so that the sleeve 22 holds the balls 7 outwardly in the path of the locking sleeve 13 as shown in Fig. 1. The inner sleeve 30 moves outwardly to a position wherein the guiding member 33 on the sleeve 30 engages the inner shoulder 11 of the sleeve 3 and the outer end of the sleeve 30 is even with the outer end of the stepped portion 5 of the sleeve 3 and the outer end of the sleeve 22 so as to completely close the end of the female coupling member 1 against dirt and other extraneous matter. The sleeve 53 is urged to a sealed position by the spring 58 as shown in Fig. 2 thereby completely closing the end of the male member 2 against dirt and other extraneous matter.

A modified form of my female coupling member shown in Figs. 6 and 7 is substantially the same as the one shown in Fig. 1 except for a slotted extension of the connecting member to provide a stop for the projecting guide member or shoulder on the inner sleeve. The female coupling member shown in Figs. 6 and 7 comprises an outer sleeve 61 having stepped portions 62 and 63, ball retaining apertures 64 in the stepped portion 63 carrying cams or balls 65, a peripheral groove 66 for retaining a stop clip 67, inner shoulders 68 and 69, and an internally threaded portion 70. A locking sleeve 72 having a depending camming portion 73 is telescopically disposed on the stepped portions 62 and 63 of the sleeve 61 and a coil spring 74 urges the locking sleeve 72 against the balls 65 and stop clip 67. An intermediate sleeve 76 is telescopically disposed in the stepped portion 63 of the sleeve 61 and it has an inwardly directed portion 77 with a peripheral groove 78 to receive a ring washer 79 and an outwardly flanged portion 81 on the opposite end thereof with a peripheral groove 82 adjacent thereto for receiving a ring washer 83. An inner cup shaped sleeve 84 is telescopically disposed in the inwardly projecting portion 77 on the sleeve 76 and it has laterally extending apertures 85 and an outwardly extending stepped flange 86 for engaging the shoulder 69 of the sleeve 61. A connecting member 87 has an externally threaded portion 88 for threadably engaging the threaded portion 70 of the sleeve 61. A washer 89 is disposed between the connecting member 87 and the sleeve 61. The connecting member 87 has an internally threaded portion 91 for connection to a conventional hose connection or the like. The outer portions 92 and 93 of the connecting member 87 and the sleeve 61 have wrench engaging portions. The inner end of the connecting member 87 has an outwardly projecting slotted portion 89a for engaging the stepped flange 86 on the sleeve 84 to limit the longitudinal movement thereof and permit free flow of fluid to prevent any back pressure from being built up. A spring 94 is disposed between the inner end of the connecting member 87 and the stepped flange 86 of the sleeve 84 to urge the sleeve to a position shown in Fig. 6.

The operation of the female coupling member shown in Figs. 6 and 7 is the same as the operation heretofore described for my novel female coupling member shown in Figs. 1 to 5 inclusive, the male member being the same as that shown in Fig. 2. The only difference is that the slotted projecting portion 89a on the connecting member 87 limits the longitudinal movement of the sleeve 84 and prevents back pressure from building up in the female coupling member.

It will be evident from the foregoing description that I have provided a novel swivel type, quickly attachable coupling wherein machining operations thereon are greatly simplified, wherein the flow of fluid is greatly increased, wherein connections between the male and female coupling members may be made without manual operation of the locking sleeve, wherein seals completely close the coupling members to dirt and other extraneous matter when they are disconnected, and wherein seals for the male and female coupling members are at a point remote from the outer ends thereof.

Various changes may be made in the specific embodiment of my invention without departing from the spirit thereof or from the scope of the appended claims.

What I claim is:

1. A coupling comprising a female coupling member having an outer cylindrical shell with stepped portions defining spaced inner shoulders therein, an intermediate sleeve and a laterally apertured inner sleeve telescopically disposed in said cylindrical shell, each of said sleeves having outwardly directed flanges on one end thereof for engaging respective spaced shoulders in said shell when said female member is disconnected, and a sealing member for sealing the flange on said intermediate sleeve and shoulder in engagement therewith; and a male coupling member having a connecting portion engaging the intermediate sleeve in said female member, said connecting portion of said male coupling member having grooved portions extending longitudinally internally thereof, a cup shaped sleeve telescopically disposed in the connecting portion of said male coupling member adapted to be moved longitudinally by the inner sleeve of said female member when they are connected together, sealing means for sealing said sleeve in said male member to the flow of fluid when said male member is disconnected, and means connecting said male and female members together.

2. A coupling comprising a female coupling member having a shell with radially extending apertures and spaced internal shoulders, camming members carried in said apertures, a camming sleeve telescopically disposed on the outer side of said shell engaging said camming members, a flanged intermediate sleeve and a flanged, laterally apertured inner sleeve telescopically disposed in said shell, the flanges on said intermediate and inner sleeves engaging respective spaced shoulders in said shell for limiting the longitudinal movement thereof in one direction; and a male coupling member having a connecting portion with a peripheral groove engaging and moving longitudinally the intermediate sleeve in said female coupling member, said connecting portion having grooved portions extending longitudinally internally thereof, a spring urged, cup shaped sleeve telescopically disposed in said connecting portion of said male coupling member adapted to be moved longitudinally by the inner sleeve of said female coupling member when they are connected together, sealing means for sealing said male coupling member to the flow of fluid when it is disconnected, and springs urging the intermediate and inner sleeves in said cylindrical shell of said female coupling member to a position wherein the flanges thereof engage respective shoulders in said shell, said camming members engaged in the peripheral groove, said intermediate sleeve holding the camming members in the path of said camming sleeve when said female coupling member is disconnected and said camming sleeve forcing said camming members into said pheripheral groove on the connecting portion of said male coupling member to automatically lock said male and female coupling members together when the connecting portion of said male coupling member is inserted into said female coupling member.

3. A coupling comprising a female member having an outer cylindrical shell, an intermediate sleeve and a laterally apertured inner sleeve with an outwardly directed flange, a connecting member attached to said shell having an axially projecting slotted portion adapted to engage the flange on said inner sleeve to limit the longitudinal movement thereof in one direction, cam members carried by said shell, and a spring urged camming sleeve engaging said cam members; a male member having a connecting portion for engaging the intermediate sleeve in said female member, said connecting portion being engaged by the cam members in said female member to lock said male and female members together, a check valve disposed in said connecting portion of said male member adapted to be moved longitudinally by the inner sleeve of said female member when they are connected together, and sealing means for sealing said male and female members when they are disconnected, said intermediate sleeve in said female member holding said cam members therein in the path of said locking sleeve upon disconnection of said coupling members.

4. A coupling comprising a female coupling member having an outer cylindrical shell, a longitudinally movable intermediate sleeve, a laterally apertured longitudinally movable cup shaped inner member, said sleeve and said cup shaped member being disposed within said shell, a first spring engaging said intermediate sleeve and said cup shaped member, a second sleeve engaging said cup shaped member and said shell, a male member having a reduced connecting portion engaging said intermediate member, the outer diameter of said shell being substantially equal to the outer diameter of said male member, the internal side of said reduced connecting portion of said male member having a longitudinally extending groove terminating short of the connecting end thereof defining a fluid flow passage, a cup shaped member telescopically disposed in said reduced connecting portion of said male member, an internal shoulder on said male member remote from the connecting end thereof, an outwardly directed flange on said cup shaped member of said male member, and a spring engaging said cup shaped member of said male member, said male member adapted to be withdrawn from said female member whereupon said flange sealingly engages said shoulder, thereby obstructing the fluid flow passage, one end of said cup shaped member moves into flush relationship with one end of said male member, and said female member intermediate sleeve and cup shaped member move into flush relation with one end of said female member.

References Cited in the file of this patent

UNITED STATES PATENTS

| Number | Name | Date |
|---|---|---|
| 137,823 | Button | Apr. 15, 1873 |
| 2,083,591 | Barks | June 15, 1937 |
| 2,307,427 | Smith et al. | Jan. 5, 1943 |
| 2,398,170 | Williams-Foxcroft | Apr. 9, 1946 |
| 2,428,637 | Scheiwer | Oct. 7, 1947 |
| 2,428,638 | Scheiwer | Oct. 7, 1947 |
| 2,461,700 | Scheiwer | Feb. 15, 1949 |
| 2,536,428 | Dimitri et al. | Jan. 2, 1951 |

FOREIGN PATENTS

| Number | Country | Date |
|---|---|---|
| 701,656 | France | Jan. 12, 1931 |